May 22, 1928.
M. I. BROWNE
1,670,953
POWER PLANT
Filed Oct. 14, 1924    10 Sheets-Sheet 6
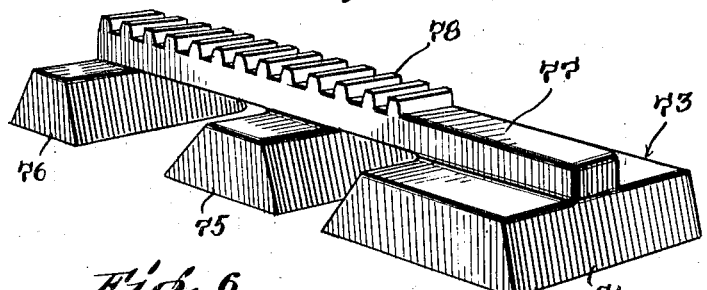
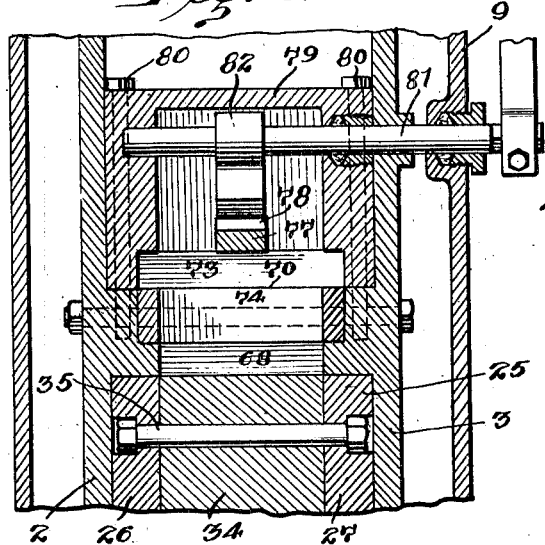
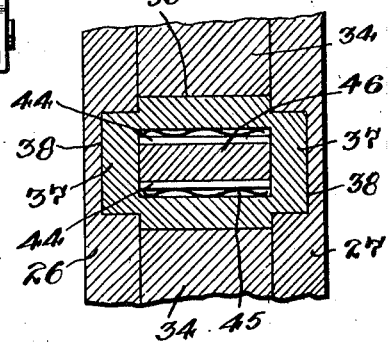
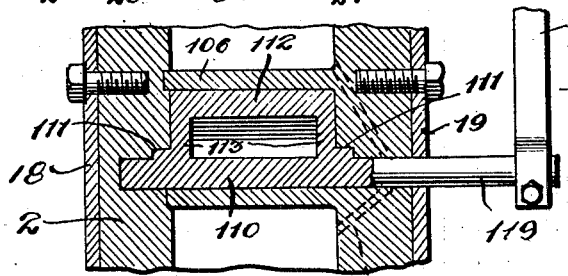
WITNESSES
INVENTOR
*Michael I. Browne*
BY
ATTORNEYS

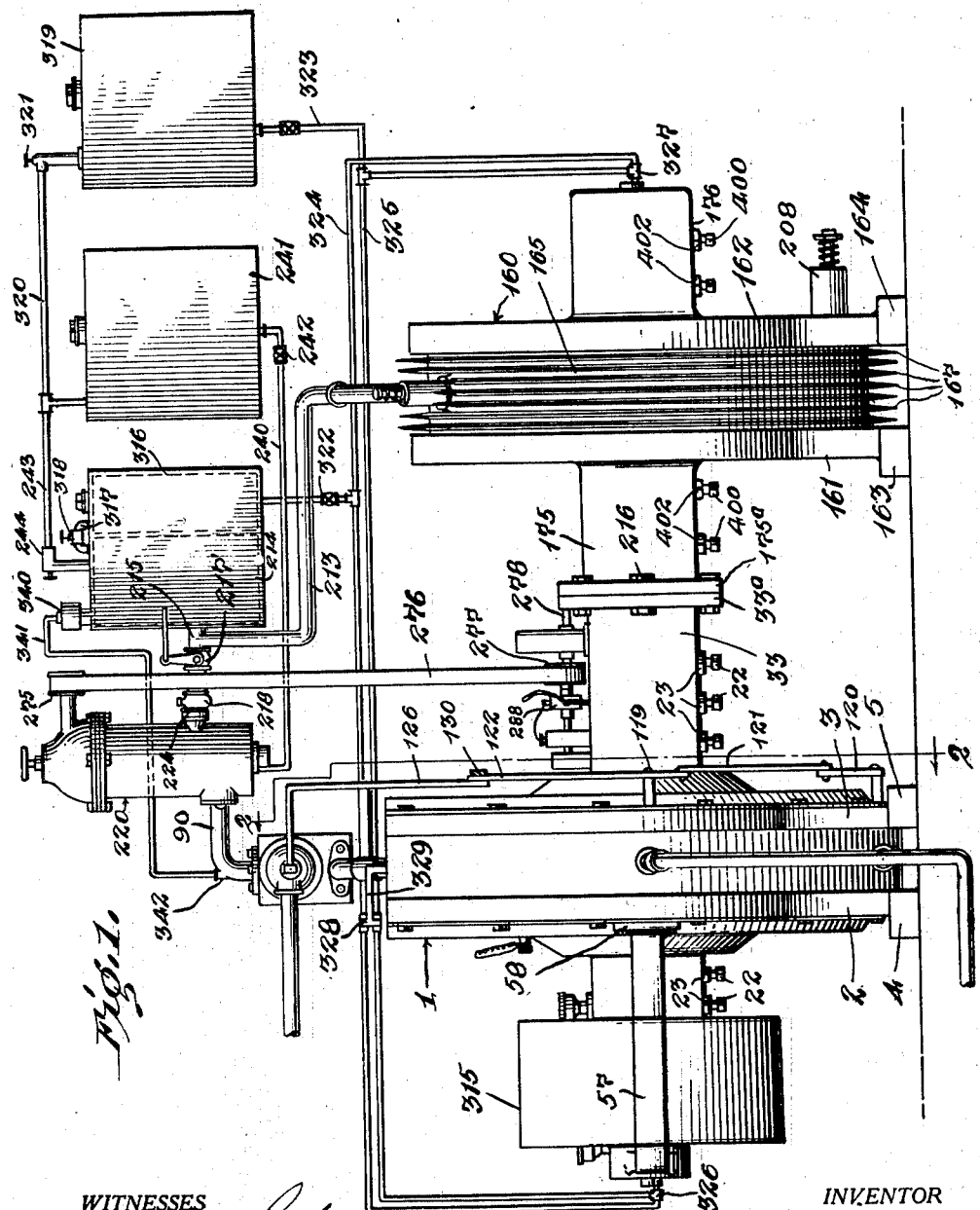

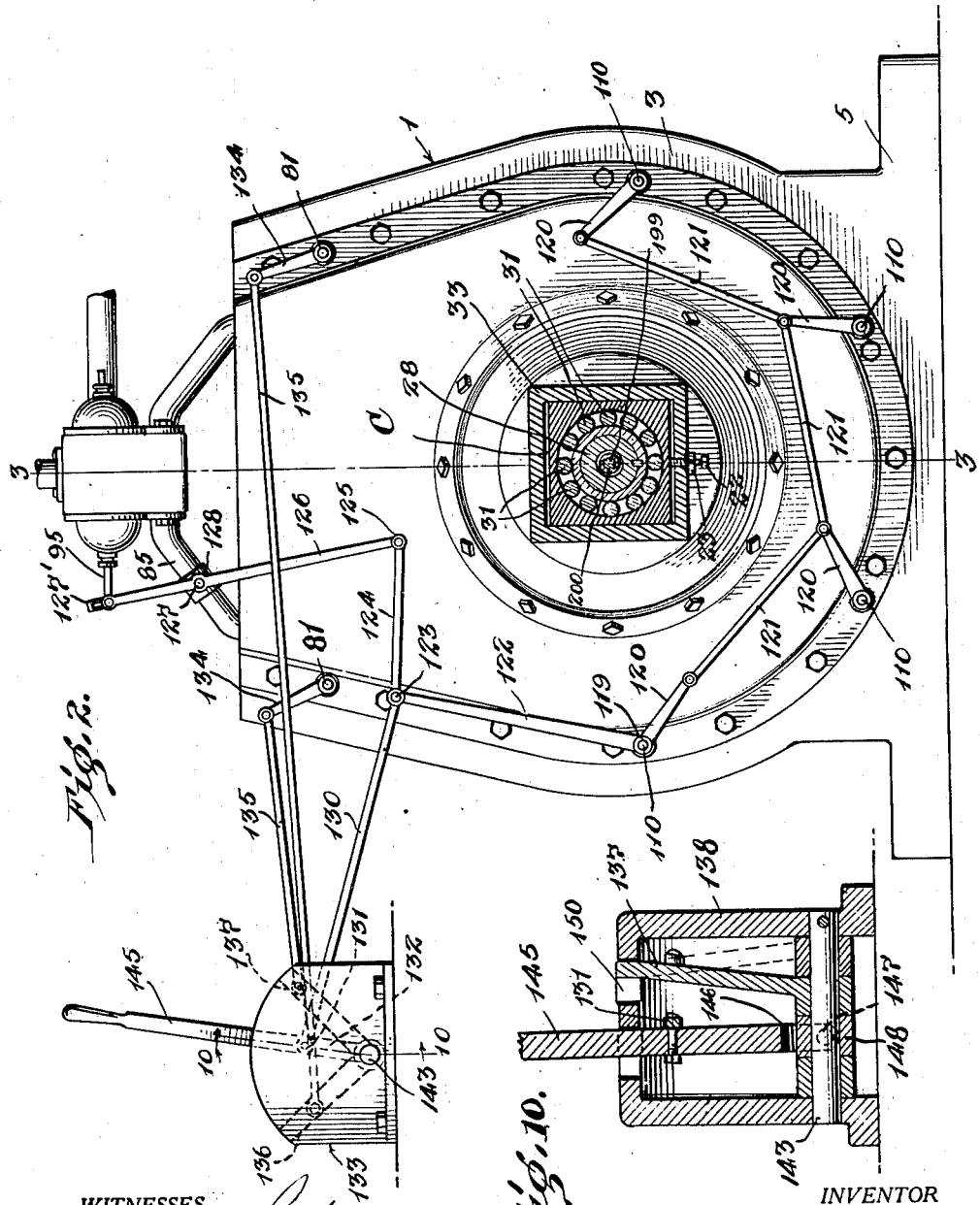

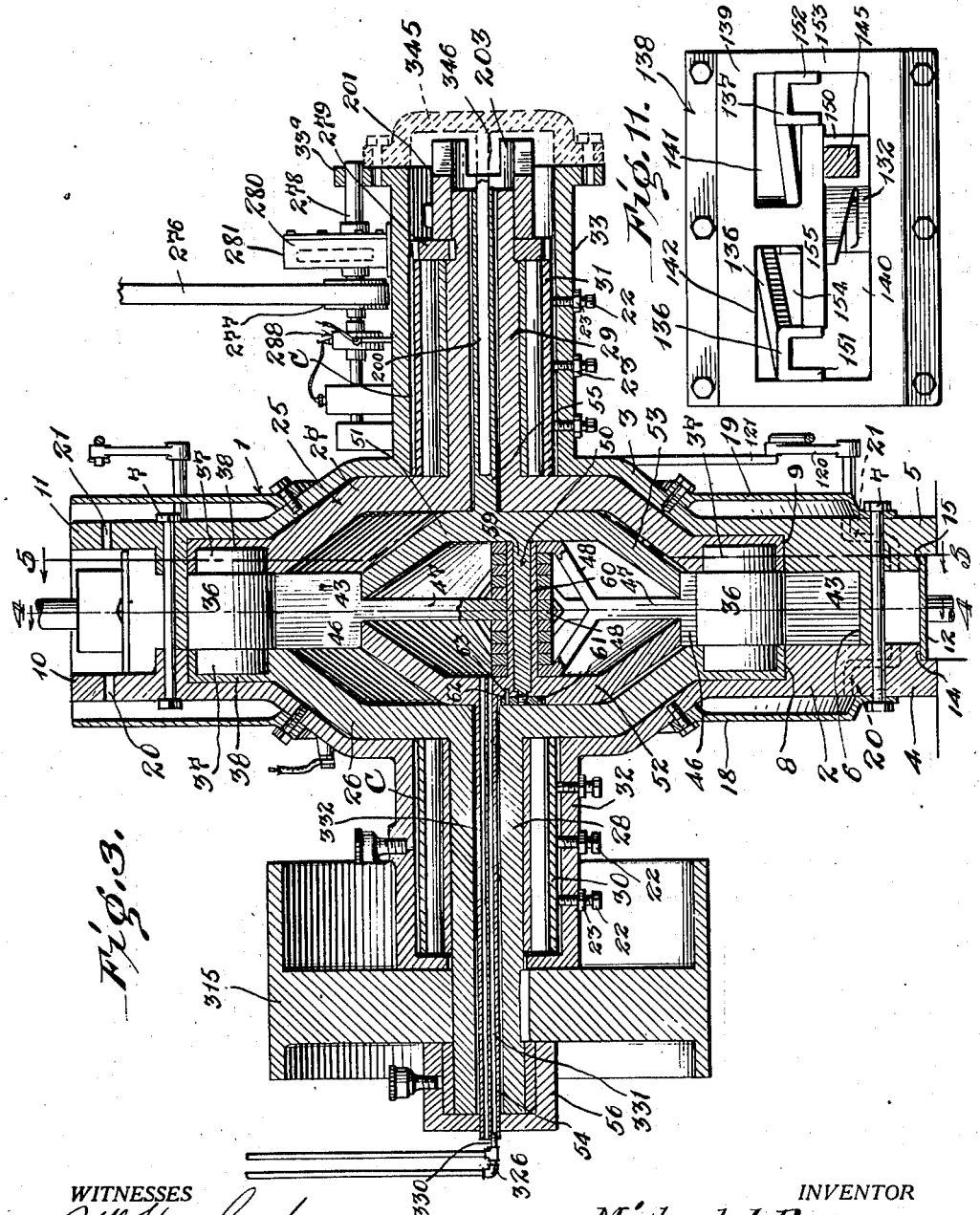

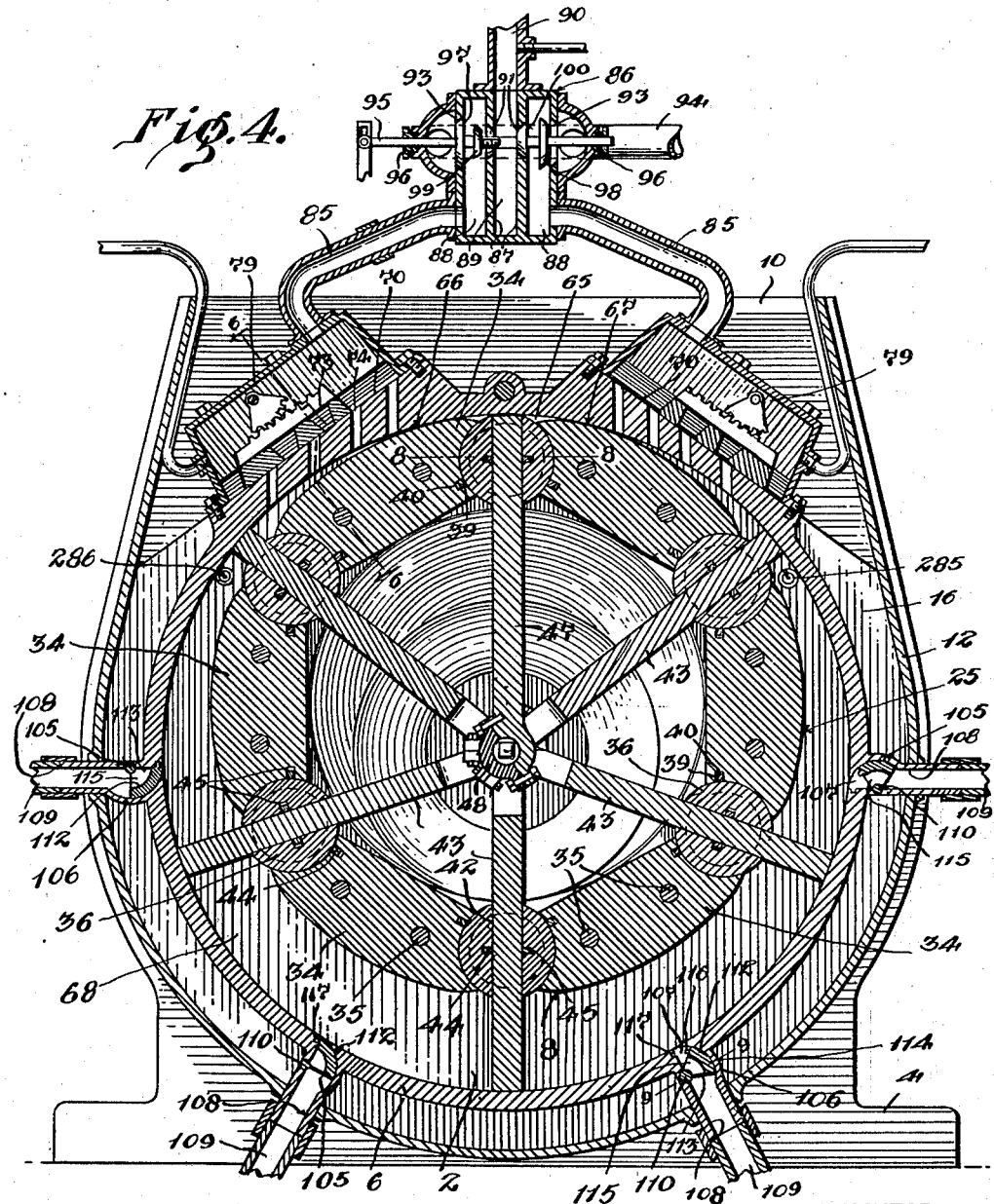

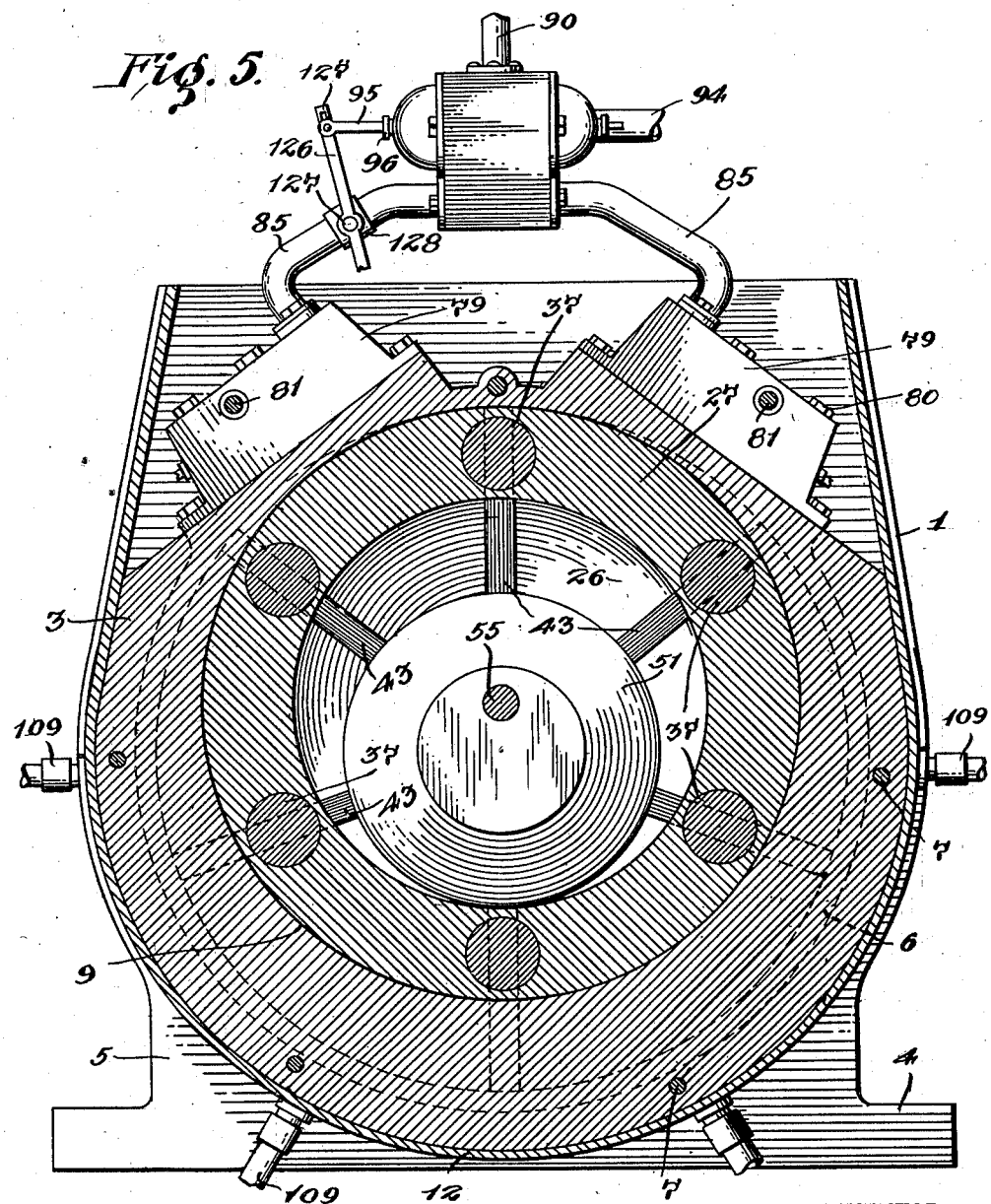

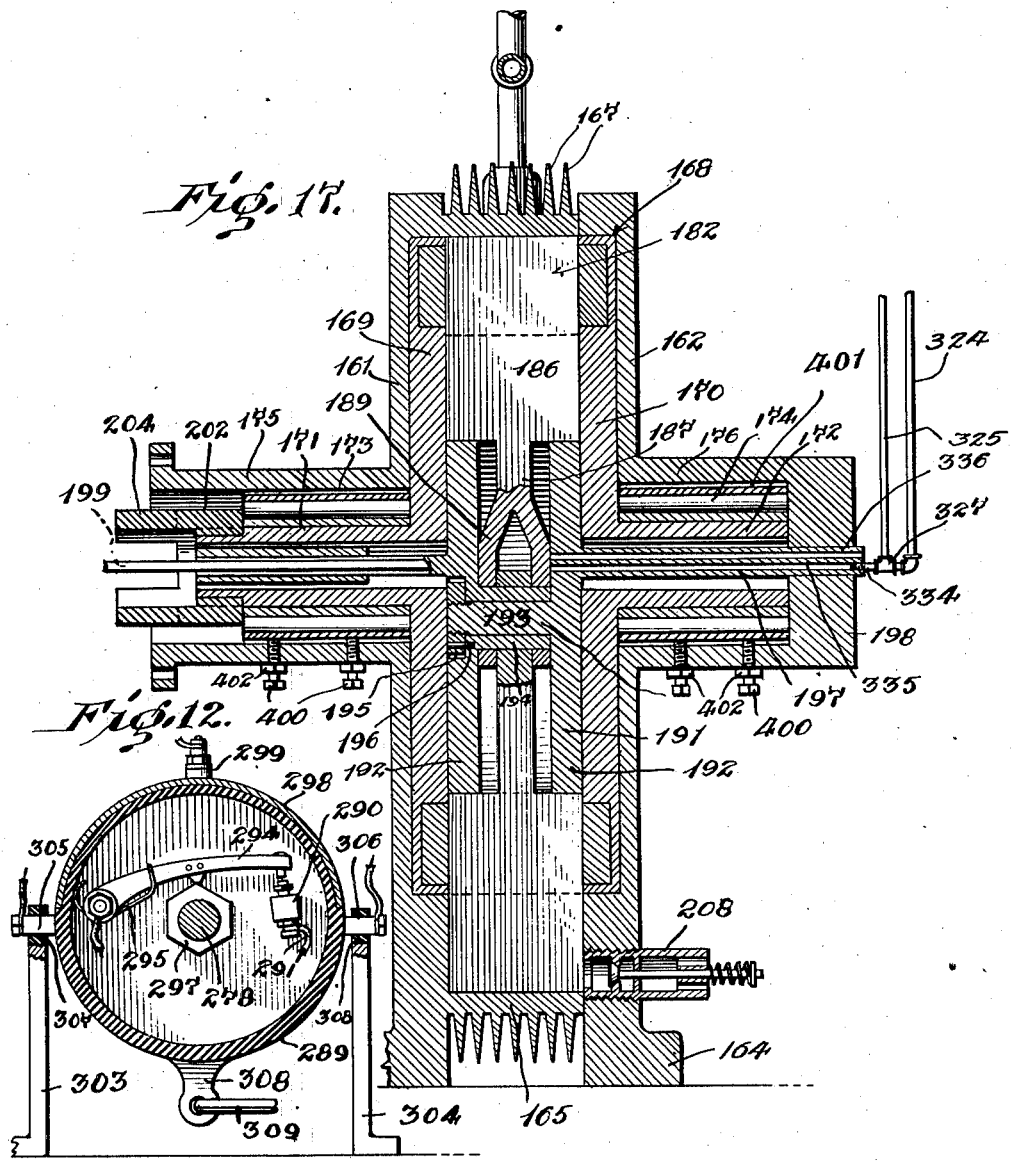

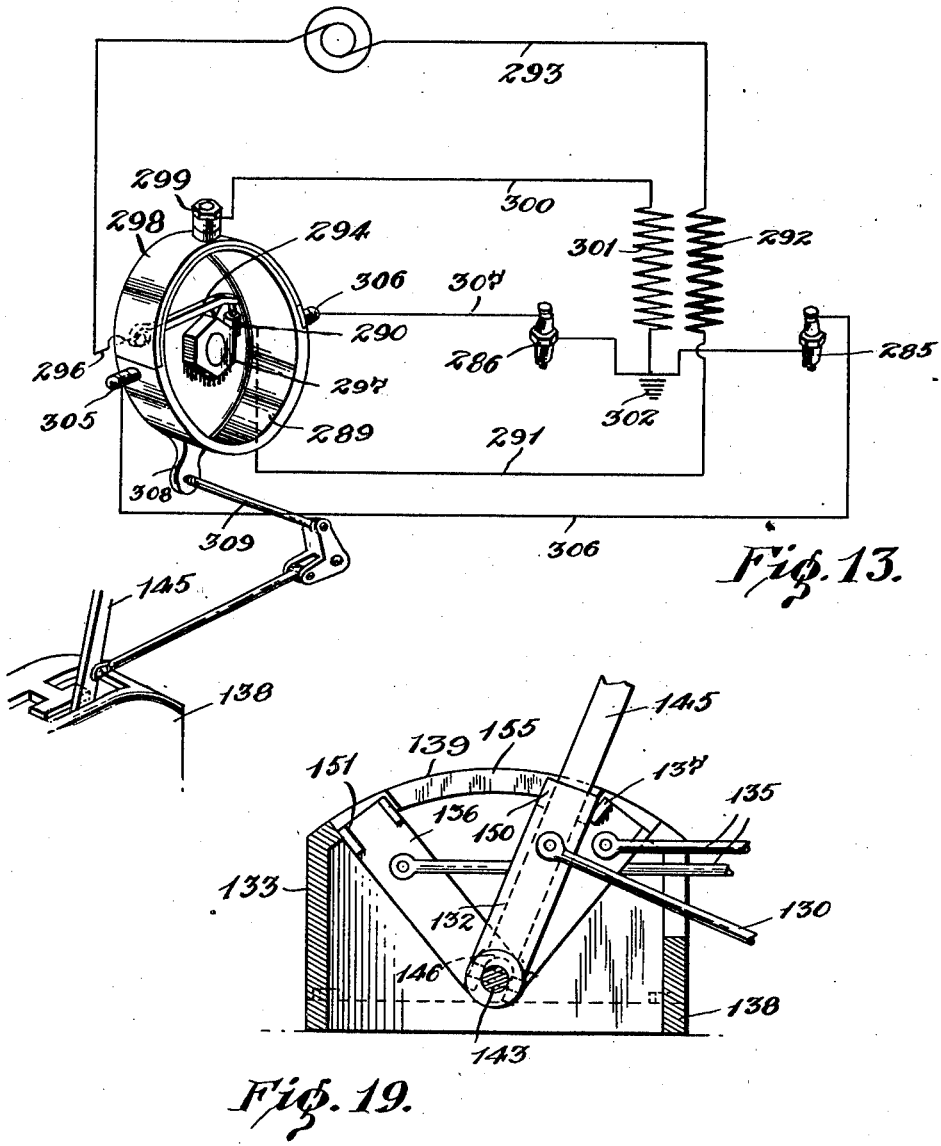

May 22, 1928.

M. I. BROWNE

POWER PLANT

Filed Oct. 14, 1924

WITNESSES
R.W. Hragland

INVENTOR
Michael I. Browne
BY
ATTORNEYS

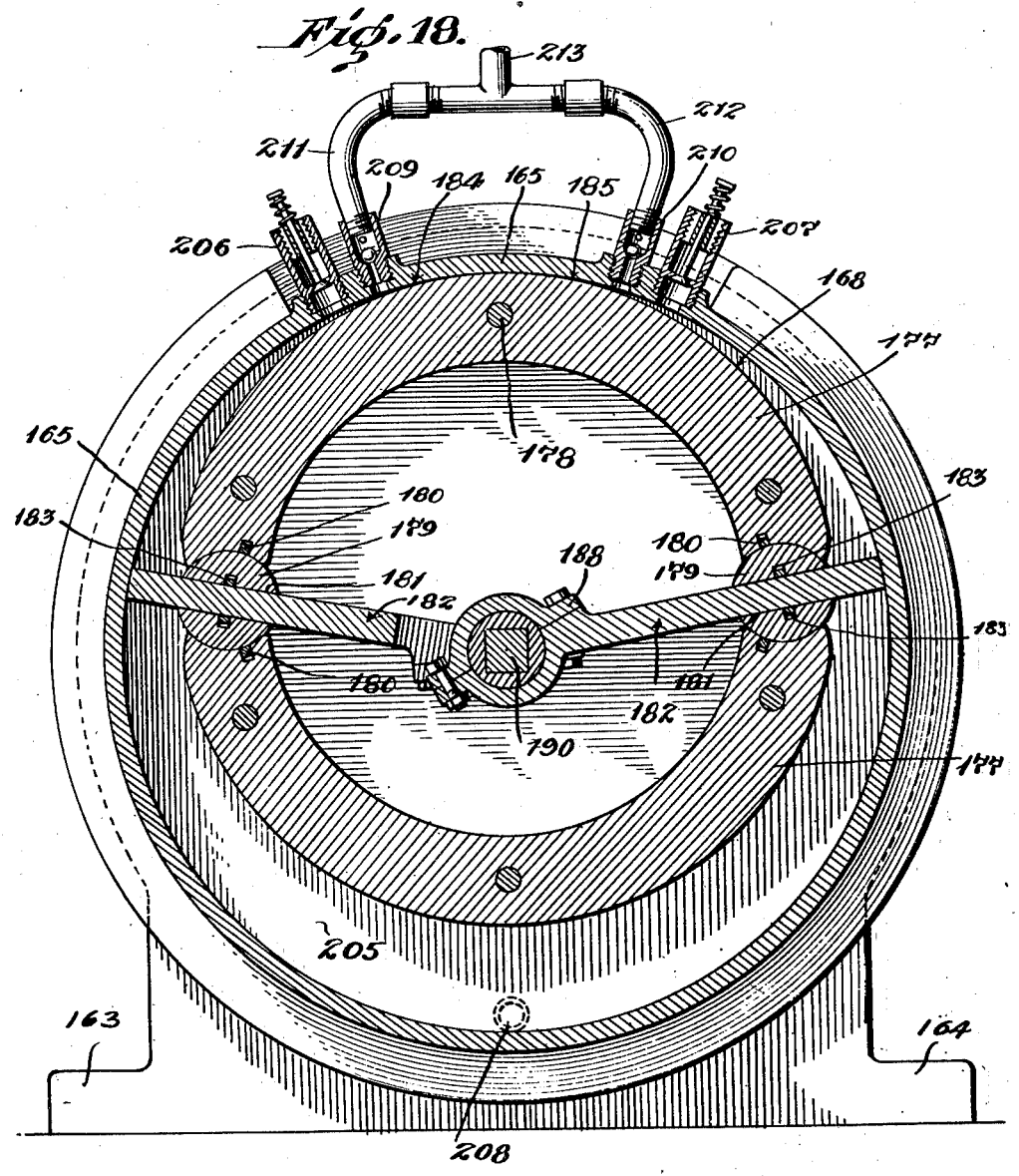

Patented May 22, 1928.

1,670,953

UNITED STATES PATENT OFFICE.

MICHAEL I. BROWNE, OF DELIA, KANSAS.

POWER PLANT.

Application filed October 14, 1924. Serial No. 743,614.

This invention relates to an improved power plant having a capacity for efficient use as an internal combustion engine, a steam engine, or the like, and in general being adapted to utilize in an effective manner any of the known motive agents.

The object of the invention is to provide a power plant having the foregoing enumerated capacities and advantages and which eliminates all reciprocating parts; which produces a constant torque; which has a high expansive efficiency; which provides for effective scavenging action; which is so constructed and organized that the walls of its expansion or working chamber are not subjected to bearing friction; which is flexible in its action and highly responsive to the control of its governor; which permits of the use of large and durable bearings that are not subjected to intermittent strains; which eliminates vibration; and which is in general of comparatively simple and durable construction, reliable and efficient in operation and susceptible of convenient and comparatively inexpensive manufacture from materials and by means of facilities ordinarily available.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a diagrammatic view in elevation of a power plant embodying the present invention;

Figure 2 is a view in transverse vertical section on line 2—2 of Figure 1 and looking in the direction of the arrows;

Figure 3 is a view in longitudinal vertical section on line 3—3 of Figure 2;

Figure 4 is a transverse section on line 4—4 of Figure 3;

Figure 5 is a similar view on line 5—5 of Figure 3;

Figure 6 is a detail view in section of the cutoff valve assembly on line 6—6 of Figure 4;

Figure 7 is a detail view in perspective of one of the sliding cutoff valves prior to assembly;

Figure 8 is a detail view in section on line 8—8 of Figure 4;

Figure 9 is a detail view in section of one of the exhaust valves, the section being taken on line 9—9 of Figure 4;

Figure 10 is a detail view in section of the operating mechanism for the valves, the section being taken on line 10—10 of Figure 2;

Figure 11 is a top plan view of this operating mechanism, the selective or main operating lever being shown in section;

Figure 12 is a detail view in vertical section of the commutator employed in the ignition system when the power plant is used as an internal combustion engine;

Figure 13 is a diagrammatic view of the ignition system employed;

Figure 17 is a view, in longitudinal section, showing the compressor employed when the power plant is used as an internal combustion engine;

Figure 18 is a similar view of the compressor in transverse section and with the parts in a slightly different position; and Figure 19 is a view in longitudinal vertical section on line 19—19 of Figure 10.

Figures 14, 15, 16:
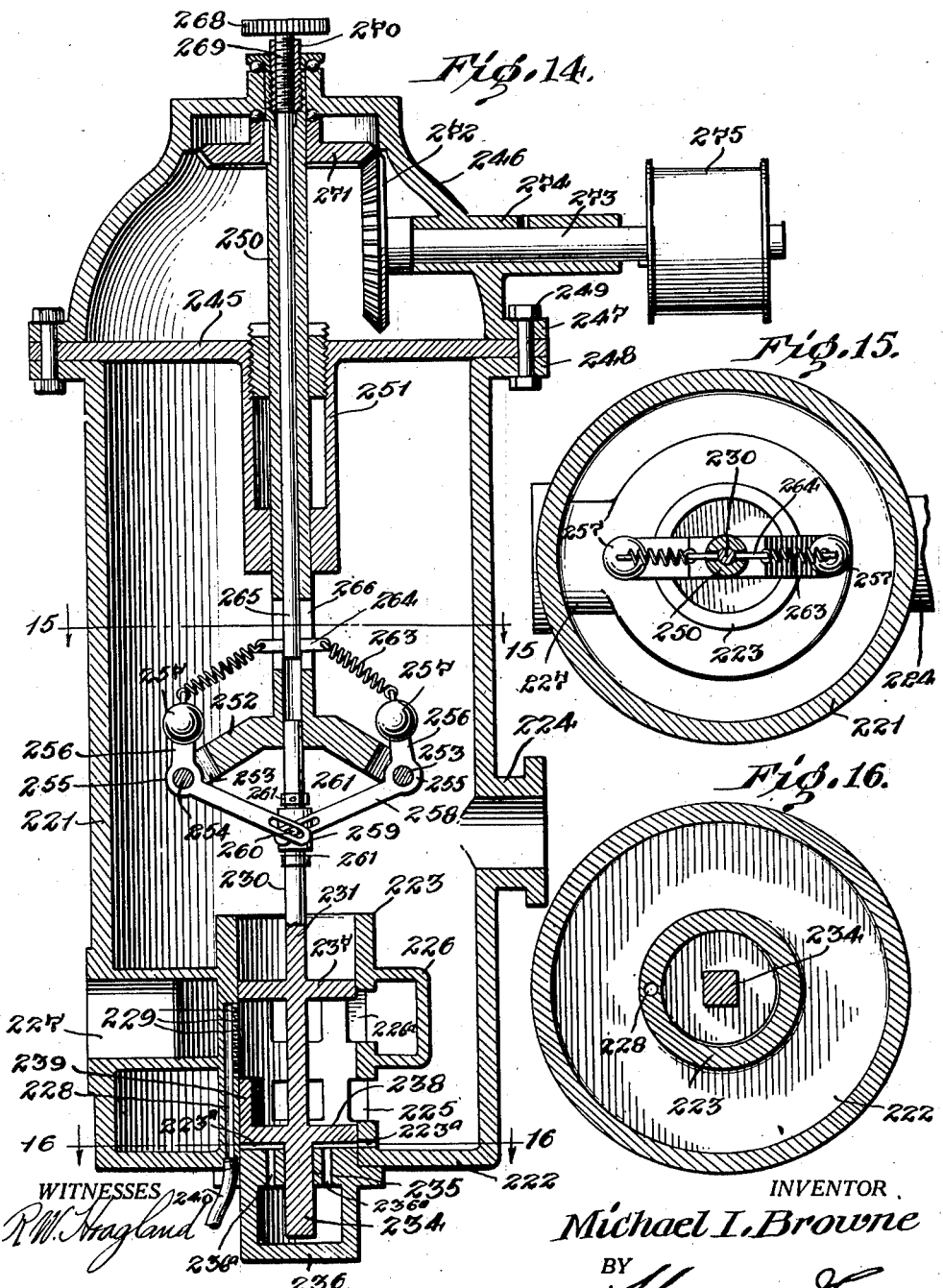
Figure 14 is a view, partly in vertical section and partly in elevation, showing the combined governor and carbureter employed when the power plant is used as an internal combustion engine.
Figure 15 is a view in horizontal section, on line 15—15 of Figure 14.
Figure 16 is a similar view on line 16—16 of Figure 14.

The invention will first be described as embodied for use as a internal combustion engine and it will thereafter be indicated what steps must be taken in order to use the power plant as a steam engine.

Referring now particularly to Figures 1 to 11 inclusive, it will be seen that the invention contemplates an engine, designated generally at 1 which is of the rotary type and which includes a stationary casing made up of casing members 2 and 3 having enlarged base portions 4 and 5 respectively to enable the engine to be conveniently and properly mounted on a suitable foundation. The casing members 2 and 3 are shaped and formed as shown in the drawings and the member 3 is provided with a substantially annular flange 6, which may be integrally formed therewith or suitably secured therewith, and this flange 6 extends toward the casing member 2 to properly space the members 2 and 3 from each other. A gasket or other suitable form of packing may be employed between the flange 6 and the casing member 2. Bolts and nuts 7 coact with the casing members 2 and 3 to hold the same in assembly. Eccentrically of the casing members 2 and 3 substantially annular shoulders 8 and 9 respectively are formed and serve as seats for the peripheries of the rotor plates as will hereinafter be more fully described.

The engine may be water cooled and to this end the casing members 2 and 3 have extensions 10 and 11 respectively at their upper portions. A substantially U-shaped wall or plate 12 extends transversely between the extensions and is secured thereto and also extends around the peripheries of the casing members 2 and 3, the plate being received on ledges 14 and 15 (see Figure 3) provided on the casing members. In this manner the extensions 10 and 11 and the plate or wall 12 which is secured to the casing members and to the extensions define with the casing member and flange 6 a hopper like water tank or cooler 16 extending entirely around the periphery of the stationary casing of the engine. The side faces of the casing members 2 and 3 have water jackets 18 and 19, respectively, secured thereto and the water spaces enclosed by the jackets 18 and 19 communicate with the hopper or tank 16 by passages 20 and 21 formed in the casing members 2 and 3, respectively.

A rotor designated generally at 25 is operatively arranged within the casing and comprises a pair of side plates 26 and 27 having their peripheries rotatively seated on the shoulders 8 and 9, respectively, and having their central portions offset as shown in the drawings in order to provide the space and clearance necessary for the journals of the vanes or pistons as will hereinafter appear. The side plates 26 and 27 have hollow shafts 28 and 29 integral therewith and extending outwardly and axially therefrom and rotatably journaled in bearings 30 and 31 provided in the tubular extensions 32 and 33 of the casing members 2 and 3, respectively. The tubular extensions 32 and 33 are of rectangular form in cross section and externally the bearings 30 and 31 are of corresponding form (see Fig. 2), and are slidably fitted in said extensions 32 and 33. Between the tops of the bearings 30 and 31 and the tops of the extensions 32 and 33 clearances C are provided to permit of vertical adjustment of the bearing to take up wear between the rotor and the casing so as to preserve the proper contact between these parts. Suitable means is provided for effecting vertical adjustment of the parts and for the sake of illustration adjusting screws 22 and lock nuts 23 are provided. Of course it is to be understood that shims or any other suitable means may be employed. In the drawings the bearings are shown supported on the screws 22 after a vertical adjustment has been made but it is to be understood that until wear has taken place the bottoms of the bearings rest on the lower wall of the extensions. Spacer blocks 34 are fitted between the plates 26 and 27 around the periphery thereof and the blocks and plates are held together in assembly by screws 35 which pass through one end of the plates and have their heads countersunk therein, traverse the spacer blocks and are threaded into the other plate of the rotor. The ends of the spacer blocks 34 are cut away and adapted to rotatably receive rocker bearings 36 as shown in Figure 8, the bearings 36 having trunnions 37 journaled in sockets 38 provided therefor in the side plates 26 and 27 of the rotor. Spring pressed packing strips 39 are fitted in grooves 40 provided in the spacer blocks and are urged into engagement with the periphery of the rocker bearings.

The rocker bearings 36 are provided with diametrical slots 42 to accommodate the vanes or pistons now to be described. In the embodiment of the invention illustrated six vanes or pistons are shown and are designated at 43 and of course there is a rocker bearing 36 for each vane or piston. The pistons 43 have a sliding fit in the slots 42 of the rocker bearings and spring pressed packing strips 44 are mounted in slots 45 in the rocker bearings and engage the opposite faces of each vane or piston. Each vane or piston 43 includes a substantially rectangular body portion 46 and a connecting rod or attaching portion 47 having a bearing 48 at its end. The rod portion 47 of all of the pistons or vanes except one are bifurcated. The connecting rod portion 47 which is not bifurcated is arranged centrally and fit in between the bifurcation of the next adjacent connecting rod. The bearings 48 are fitted on a fixed shaft or axis, designated generally at 50 and serve to constrain the vanes or pistons 43 to rotation about its fixed axis. This shaft 50 is mounted on a stator 51 including fixed plates 52 and 53 having shafts 54 and 55 secured thereto and extending through the hollow shafts 28 and 29 of the rotor. The shaft 54 is secured in a bracket 56 having a curved arm 57 extending around the pulley to be hereinafter described and terminating in an attaching plate 58 suitably secured to the casing member 2. The other shaft 55 is suitably supported and fixed in a manner which will hereinafter more fully appear. The shaft or fixed axis 50 of vanes of the pistons 43 is preferably made up of telescoping sections 59 and 60 of polygonal cross section and carried by the plates 51 and 52 of the stator. A nut 61 is threadedly connected with the section 59 and engages the wall of the recess 62 provided therefor in the plate 52. This nut may also be pinned to the plate 52, as indicated at 63.

The arrangement is such that the shaft or axis 50 about which the vanes or pistons 43 rotate is concentric with the flange 6. The flange 6 is substantially circular, except for a portion 65 at the top of the engine which curves or bulges outwardly to some extent. The rotor and the shoulders 8 and 9 on which the plates of the rotor seat are arranged eccentric with respect to the flange 6 and of course with respect to the shaft 50 and this eccentricity is such that the periphery of the rotor is effectively tangent to or has contact with the flange 6 at two points designated at 66 and 67 in Figure 4. It is obvious that the periphery of the rotor, the flange 6 and the comprehended portions of the casing members 2 and 3 define a working or expansion chamber 68.

On each side of the outwardly curved or bulged portion 65 of the flange 6, the flange 6 is enlarged to provide valve seats 70 for sliding cutoff valves, designated generally at 73. Each valve seat 70 is traversed by a plurality of ports 74 which are controlled by the sliding cutoff valves 73. As shown to advantage in Figure 7, each valve 73 is made up of three blocks, designated at 71, 75 and 76 which are of progressively decreasing size in the order named and which are secured together in assembly by a longitudinal top rib or bar 77 integral with or suitably secured to the blocks and having a portion 78 formed to constitute a rack. The cutoff valves 73 are used after the engine has been started in order to increase expansion efficiency as will presently appear, and are designed so that the blocks 71, 75 and 76 each cut off a port 74 at the proper time, however at least one port 74 is always permitted to remain open. A valve casing 79 is provided for each cutoff valve and is secured in position by screws 80, see Figure 6. A shaft 81 extends through each valve casing 79 and projects exteriorly of the water jacket. Suitable packing is provided for each shaft 81. Within the casing 79 a geared or toothed sector 82 is fixed to the shaft 81 and has its teeth meshed with the teeth of the rack 78. In this manner each cutoff valve may be readily shifted.

The casings 79 of the sliding cutoff valves are connected by pipes 85 to the opposite sides of a reversing valve casing 86. Within the casing 86 partitions 87 are arranged and divide the casing into side chambers 88 and a central chamber 89. A fuel supply pipe 90 communicates with the central chamber 89. This central chamber 89 may be brought into communication with either of the chambers 88 through the ports 91 provided in the partitions 87 and the chambers 88 may communicate with an exhaust manifold 92 through ports 93 provided in the side walls of the casing 86. An exhaust conduit 94 leads from the exhaust manifold 92. A valve rod 95 is mounted for sliding movement on the exhaust manifold 92, the valve rod operating through stuffing boxes 96 and extending through the ports 91 and 93. Oppositely disposed exhaust valves 97 and 98 are fixed to the rod and alternately coact with valve seats provided around the ports 93. Oppositely arranged inlet valves 99 and 100 are also fixed to the valve rod 95 and alternately coact with the valve seats provided around the ports 91. In the arrangement shown in Figure 4 the exhaust valve 97 closes the port 93 to the left, as viewed in Figure 4 and the inlet valve 100 closes the port 91 disposed on the right-hand side of the central chamber 89 as viewed in Figure 4, whereas the inlet valve 99 on the left of the chamber 89 and the exhaust valve 98 on the right of Figure 4 are open. With this arrangement of the reversing valve the motive fluid flows from the chamber 89 through the port 91 and chamber 88 on the left-hand side of the valve as viewed in Figure 4 and thence through the pipe 85 and casing 79 to the ports 74 on the left-hand side of the engine, as viewed in Figure 4. The motive agency then produces a counterclockwise movement of the rotor, as viewed in Figure 4 in a manner which will be hereinafter more fully described and is exhausted in part through the ports 70, valve casing 79 and pipe 85 on the right-hand side of the engine, as viewed in Figure 4 into the right-hand chamber 88 and out through the port 93 to the right of Figure 4 into the exhaust manifold 92. Obviously when the valve rod 95 is shifted to the right, as viewed in Figure 4 a reverse action and a reverse rotation of the rotor will occur. In order to facilitate assembly of the parts the valve rod is made in sections which are coupled together in the assembly in any suitable manner.

In order to provide for thorough and speedy exhaust in either direction of rotation as well as for complete scavenging two exhaust valves 105 are provided on each side of the vertical diameter of the engine, there being four exhaust valves 105 in all. Each exhaust valve 105 includes a casing 106 integrally formed or otherwise secured to the flange 6 of the stationary casing and communicating with the working chamber 68 through a port 107. The casing is provided with a nipple 108 suitably coupled with an exhaust pipe 109. A rotary shaft 110 is provided and is journaled in suitable bearings provided therefor in the casing members 2 and 3, as shown in Figure 9. The shaft is enlarged, as at 111 to enlarge the bearing and better the character thereof on the casing members. The valve proper comprises an arcuate plate 112 connected to the shaft 110 by triangularly formed end plates 113. The housing 106 has a portion 114 which conforms to the contour of the plate valve 112 and which accommodates this valve in the open position of the valve. The triangular end plates 113 space the arcuate body portion 112 of the valve away from the shaft 110 and leave a passageway 115 through the valve which communicates with the port 107 and the nipple 108 in the open position of the valve. In the closed position of the valve a tongue 116 formed on one edge of the arcuate body portion of the valve fits into a groove 117 provided in an adjacent portion of the flange 6. It will be noted that the exhaust valve housings 106 extend across the tank 16 and in order to provide for circulation around this housing the casing members 2 and 3 are formed with passages 118. (See Fig. 9.)

Each shaft 110 has a portion 119 projecting exteriorly of the casing of the engine and to this projecting portion 119 a crank arm 120 is fixed. Links 121 are pivotally connected at their ends to these several crank arms and in this manner the exhaust valves are so constrained in their movements that both exhaust valves 105 which lie on the same side as the vertical diameter of the engine are closed or open and so that when the exhaust valves which lie on one side of the vertical diameter of the engine are open the exhaust valves which are on the opposite side of the diameter are closed and vice versa. This action is obtained by giving the proper angular relation to the arms 120 with respect to each other and with respect to the shafts with which they are connected. A second crank arm 122 is fixed to the projecting portion 119 of one of the shafts 110 and this second crank arm is pivotally connected as at 123 to one end of a link 124 see Figure 2, the opposite end of which link 124 is pivotally connected, as at 125 to the lower end of a rocker 126 fulcrumed, as at 127, to the sleeve 128 fixed to one of the pipes 85. The upper end of the rocker 126 has a pin and slot connection, as at 127', to the outer end of the valve rod 95. By connecting the reversing valve up with the exhaust valves in this manner the proper relation and adjustment of both the reversing valve and the exhaust valves are insured at all times. A connecting rod 130 has one end pivotally secured to the connection 123 between the second crank arm 122 and the rod 124 and the opposite end of this connecting rod 130 is pivotally secured, as at 131, to a secondary lever 132 of a set of operating levers, designated generally at 133. The projecting portions of the shafts 81 of the operating mechanism of the cutoff valves has secured thereto crank arms 134 connected by means of rods 135 to secondary levers 136 and 137 of the set of levers 133. The levers 132, 136 and 137 of the set of levers 133 operate in a casing 138 having an arcuate top 139 provided with a long slot section 140 and short slot section 141 and 142, the slot sections together taking the form of a C-shaped slot. A common fulcrum 143 is provided for the secondary levers 132, 136 and 137, the fulcrum being a shaft fixed to the casing 138 and having the secondary levers loosely mounted thereon. A selective or main operating lever 145 is included in the set 133 and has its lower end bifurcated, as at 146 and pivotally connected to trunnions 147 projecting laterally from a collar 148 loosely mounted on a fulcrum shaft 143. The trunnions 147 thus provide for the pivotal mounting of the lever 145 at right angles to the pivotal mounting provided by the collar 148 and thus the lever 145 has a universal mounting on the fulcrum shaft 143. The secondary levers 132, 136 and 137 are constructed so as to be resilient or yieldable in a direction transverse to the path of their intended movement and these levers are provided at their upper ends with U-shaped seats or sockets designated at 150, 151 and 152, respectively. The selective or main operating lever 145 is adapted to be selectively engaged with the sockets 150, 151 or 152 so as to shift in the desired manner the levers 132, 136 and 137. It will be noted that the U-shaped socket 150 of the secondary lever 132 is oppositely disposed with respect to the U-shaped sockets 151 and 152 of the secondary levers 136 and 137 and as the long slot section 140 communicates at its ends with the short slot sections 141 and 142, the main control lever 145 may be shifted laterally to be disengaged from the socket 150 of the secondary lever 132 and to be engaged with the sockets 151 or 152 of the secondary levers 136 and 137, respectively, depending upon the position of the main operating lever at one end or the other of the long slot section 140. It will be noted that the loose mounting of the collar 148 on the fulcrum shaft 143 permits longitudinal rocking movement of the lever 145 in any of the slots 140, 141 or 142 whereas the transverse rocking movement is had by virtue of the mounting of the lever 145 on the trunnions 147 of the collar. As has been noted the levers 132, 136 and 137 are transversely resilient and they are also so tensioned and formed as to spring into position between the ends 153 of the casing 138 and the extremities 154 of the central dividing rib 155 of the arcuate top 139 of the casing when these levers are disposed at the ends of their respective slots whereby the levers are releasably held in adjusted position.

A compressor, designated generally at 160 is provided and is shown to advantage in Figures 1, 17 and 18. The compressor comprises a casing made up of casing members 161 and 162 having their lower portions enlarged, as at 163 and 164 whereby the casing may be supported and secured to a suitable foundation. The casing member 161 is provided with a substantially annular flange 165 which extends laterally therethrough and engages the casing member 162 to maintain the members in properly spaced relation. Bolts and nuts or other suitable fastening devices are employed for securing the casing members in assembly. A plurality of circumferentially extending radiating ribs or fins 167 are provided on the flange 165.

A rotor 168 is operatively arranged within the casing and includes a pair of side plates 169 and 170 having hollow shafts 171 and 172 integral therewith and extending axially therefrom. The shafts 171 and 172 are journaled in bearings 173 and 174 provided therefor on the extensions 175 and 176 of the casing members 161 and 162. The tubular extensions 175 and 176 are of rectangular form in cross section and the bearings 173 and 174 are of corresponding form externally and are slidably fitted in the extensions. The bearings 173 and 174 are vertically adjustable in the extensions, adjusting screws 400 and a clearance 401 being provided for this purpose. Lock nuts 402 may be employed in conjunction with the screws 400. Arcuate spacer blocks 177 are interposed between the peripheries of the plates 169 and 170 and the plates are bolted to each other through these spacer blocks, as indicated at 178. The ends of the spacer blocks are shaped and formed to rotatably receive rocker bearings 179. Spring pressed packing strips 180 coact with the rocker bearings, the packing strips 180 being received in slots provided therefor in the block. Each rocker bearing is formed with a transverse or diametric slot 181 through which a piston or vane 182 extends, and has a sliding fit. Packing strips 183 are carried by the bearings and engage the opposite faces of the pistons or vanes 182. It is to be noted at this point that the rotor construction and in fact the entire construction of the compressor is similar in many respects to the engine construction, and in fact these structures differ only in the valves controlling the operation and in fact that only two vanes or pistons are employed in the compressor. The fact that only two vanes or pistons are employed in the compressor makes it unnecessary to provide a great amount of clearance for the bearings of the pistons on their fixed bearing or axes and for this reason the side plates of the rotor are flat in the compressor whereas they are dished or have their central portions offset in the engine. As in the engine the rotor 168 of the compressor is arranged eccentric with respect to the flange 165 and is also so disposed as to be effectively tangent to or have contact with the flange 165 at two points, designated at 184 and 185, the flange 165 curving or bulging outwardly slightly between the points 184 and 185 to accommodate the uppermost portion of the rotor.

Each vane or piston 182 includes a substantially rectangular body portion 186 and a connecting portion 187 having a bearing 188 at its extremity. One of the pistons has its connecting portion bifurcated, as at 189 so that the arms of the bifurcation 189 extend on either side of the bearing 188 of the outer piston. Both of the pistons are constrained to rotation about a fixed axis 190 by virtue of the fact that their bearings 188 are fitted and revolubly secured on said axis. The axis 190 is a part of the stator, designated generally at 191 made up of side plates 192 having telescoping sections 193 and 194 which make up the axis 190, the sections being held together by a nut 195 and pin 196. It will be noted that the axis 190 is substantially concentric with respect to the flange 165. A fixed shaft 197 extends from one of the sides plates 192 and is mounted and secured in a head 198 formed at the end of the extension 176 of the casing member 162. A rod 199 of polygonal cross section is integrally formed with or suitably secured to the other plate 192 of the stator and when the compressor is assembled with the engine this rod 199 is fitted into a polygonal socket 200 formed in and extending axially of the fixed shaft 55 of the stator of the engine. The rotors of the engine and compressor are also coupled by means of clutch collars 201 and 202 splined to the shafts 29 and 171, respectively, and having squared and interfitting teeth 203 and 204.

In the compressor the flange 165, rotor 168 and the comprehended portions of the casing members 161 and 162 define a working chamber 205 through which portions of the pistons 182 which project from the rotor sweep. Check valve controlled inlets 206 and 207 are provided for this working chamber 205 at the top of the compressor and on the opposite sides of the vertical diameter. A single check valve controlled inlet 208 is provided in the lower portion of the compressor as shown in Figures 17 and 18. Check valve controlled outlets 209 and 210 are arranged adjacent the inlets 206 and 207, respectively, and these outlets 209 communicate by branch pipes 211 and 212 with an offtake pipe 213 leading to a pressure tank 214 through a feed pipe 215. It is to be noted that when the compressor is coupled up with the engine not only is the rod 199 fitted in the socket 200 of the shaft 55 and the teeth 203 and 204 of the clutch members engaged but the flanges 33ᵃ and 175ᵃ of the extensions 33 and 175 are bolted together as shown at 216 in Figure 1.

The feed pipe 215 to which the offtake pipe 213 of the compressor connects has embodied therein a throttle valve 217 and a reducing valve 218 and beyond the reducing valve this feed pipe connects with a combined carburetor and governor, designated generally at 220. The combined carbureter and governor 220 comprises a cylindrical housing 221 having a head 222 closing its lower end. The head 222 is formed with a central opening and a sleeve 223 surrounds this central opening and extends vertically up in to the housing 221. The sleeve 223 terminates however below the nipple 224 to which the feed pipe 215 is connected. A plurality of air inlet ports 225 are formed in the sleeve near its lower end and spaced from and above the inlet ports outlet ports 226ᵃ are formed in the sleeve and communicate with an outlet manifold 226 which leads to a connection 227 coupled to one end of the supply pipe 90. A vertical passage 228 is formed in the sleeve 223 and communicates with the interior thereof by a plurality of jets 229. A valve designated generally at 230 is provided in conjunction with the sleeve 223 and includes a vertical valve stem 231 extending axially of the sleeve and having at its lower end a guide portion 234 of polygonal cross section which is operatively fitted in a guide opening 235 formed in a guide 236 screwed into the opening of the head 222. An upper valve plate 237 is fixed to the stem 231 and closes the upper end of the sleeve in all positions of the valve. A lower valve plate 238 is also fixed to the valve stem below the plate 237, and this lower valve plate 238 serves to partially or entirely cut off the air flowing into the sleeve through the ports 225 depending of course upon the position of the valve. The lower valve plate 238 carries an upstanding arcuate plate 239 which lies flush against the inner wall of the sleeve and which is adapted to close one or more of the jets 229 as the valve stem is raised. In the lowermost position of the valve 230 the upper edge of the plate 239 is immediately below the lowest jet 229 and thus the maximum supply of fuel is obtained. With this arrangement the air flowing into the interior of the casing 221 passes through the ports 225 into the interior of the sleeve wherein it commingles with the fuel issuing from the jets 229, the portion of the sleeve 223 comprehended between the plates 237 and 238 constituting the mixing chamber or contact space of the carburetor. The commingled air and fuel passes out through the ports 226ᵃ and exhaust manifold 226 to the supply pipe 90 of the engine.

Vents 223ᵃ and 236ᵃ are provided in order that the pressures exerted on the elements of the valve arrangement may be balanced.

Fuel is supplied to the passage 228 by means of a fuel pipe or line 240 which extends to a fuel tank 241. A shut off valve 242 is embodied in the fuel line 240. In order that the fuel may be fed under pressure a pipe line 243 leads from the compressed air tank 214 to a fuel tank 241 and a reducing valve 244 is embodied in this line, in order that the proper pressure may be applied to the fuel tank.

A head plate 245 fitted against the upper end of the casing 221 and a dome-shaped top 246 is superposed on this head plate. The top 246 and the casing 221 are provided with opposed flanges 247 and 248 respectively between which the periphery of the plate 245 is interposed and these parts are secured in assembly by means of bolts and nuts 249. The governor which is combined with the carbureter is mounted on the top 246 and plate 245 and includes a hollow shaft 250 extending axially of the casing 221 and journaled for rotative movement on the plate 245 and top 246. A stuffing box 251 is provided for the shaft 250 and is carried by the plate 245. The lower end of the shaft 250 is provided with a pair of diametrically opposite and outwardly extending arms 252, the outer ends of which are yoked, as at 253, and apertured to receive the pivots 254 of bell crank levers 255. The bell crank levers 255 have short arms 256 provided with ball weights 257, and these same levers have long arms 258, the outer ends of which are yoked and fastened to a collar 259 by pin and slot connections 260. The collar 259 is loosely fitted on the valve stem 230 and is held against endwise movement thereon by collars 261. The ball weights 257 are connected to retractile coil springs 263 carried by a cross pin 264 which is fixed to the lower end of a stop rod 265. The stop rod 265 extends up through the hollow shaft 250 and the cross pin 264 operates in a diametrical slot 266 formed in the shaft 250. The upper end of the stop rod carries a thumb nut 268 and adjacent this thumb nut the stop rod 265 is externally threaded, as at 269 and engaged with a bushing 270 so as to be longitudinally adjustable in the shaft 250 when turned. The lower end of the stop rod 265 is engageable with the upper end of the valve stem 230 to limit the movement of the valve. A beveled gear 271 is fixed to the upper end of the hollow shaft 250 and is meshed with a second beveled gear 272 fixed to one end of the shaft 273 journaled in the bearing 274 provided in the top 246. The shaft 276 extends exteriorly of the top and the portion thereof projecting beyond the top has fixed thereto a pulley 275. As shown in Figure 1 the pulley 275 is driven by a belt 276 from a pulley 277 fixed to a countershaft 278 journaled in bearings provided therefor on the extension 33 of the casing member 3 of the engine. The counter-shaft 278 is driven in timed relation from the rotor of the engine by means of a gear 279 fixed to the shaft 29 of the rotor, and meshing with a gear 280 fixed to the counter-shaft 278 and enclosed in a suitable housing 281.

The ignition system of the engine includes spark plugs 285 and 286 which are screwed into the casing member 2 of the engine and have their sparking points located in recesses provided therefor and in direct and open communication with the working chamber 68. The spark plugs 285 and 286 are located on the opposite sides of the engine, as shown in Figure 4 and of course when one spark plug is in operation, the other is idle, two spark plugs being provided in order to make the engine reversible. As shown in Figures 1, 3, 12 and 13 the ignition system includes a commutator or timer, designated generally at 288. The timer 288 consists of a shell or casing 289 of insulating material which is loosely mounted on the counter-shaft 278 so that the shaft 278 freely rotates with respect to the housing or shell 289. As shown to advantage in Figures 12 and 13 a fixed contact 290 is carried by the housing and is electrically connected by means of a conductor 291 to one end of a primary coil 292, the other end of the primary coil being connected by a wire 293 to one pole of a source of current. A movable contact in the form of a pivot arm 294 is also mounted within the casing and is urged by a spring 295 toward the movable contact 290. The movable contact 294 is electrically connected by a wire 296 to the other terminal or pole of the source of current. A polygonal rotor 297 is fixed to the shaft 278 and coacts with the pivoted arm 294 to periodically move the same away from the fixed contact 290 to make and break the primary circuit of the ignition system at the proper times in the cycle of operation. The outer periphery of the shell 289 has embedded therein a substantially semi-annular contact strip 298 having a binding post 299 mechanically and electrically connected thereto. A wire 300 leads from the binding post 299 to one end of a secondary coil 301. The other end of the secondary coil is grounded, as at 302. At diametrically opposite portions of the shell 289 brackets 303 and 304 are arranged and have contact shoes 305 and 306 mounted in insulated supports 307 and 308 provided therefor in the upper ends of the brackets. The contact shoe 305 is electrically connected by means of a wire 306 with one electrode of the spark plug 285 and the other electrode of the spark plug is grounded. The contact shoe 306 is electrically connected by means of the wire 307 to one electrode of the spark plug 286 and the other electrode of the spark plug is grounded. The under side of the shell or casing 282 has fixed thereto an apertured lug 308 pivotally connected to a rod 309. The rod 309 is connected by a series of links and bell crank levers to the main reversible lever 145 so as to be actuated in accordance with the movements of said lever. Thus when the lever 145 is set to cause the rotor 25 to move in a counterclockwise direction, as viewed in Figure 4, the shell 289 will be shifted to bring the contact strip 298 into contact with the shoe 306. This completes the secondary circuit through the spark plug 286 so that when the arm 294 engages the fixed contact 290 current flows from the source through the wire 293, primary coil 292, wire 291, contact 290, arm 294, and wire 296 back to the source. This flow of current induces a high tension current in the secondary circuit so that the current flows from the secondary coil 301, wire 300, binding post 299, contact strip 298, shoe 306, wire 307 to the spark plug and from whence it passes to the ground and back to the secondary coil. Of course it is to be understood that a vibrator may be associated with the primary coil 292 in the usual manner. If the main lever 145 is set to cause the rotor 25 to rotate in a clockwise direction as viewed in Figure 4, the strip 298 is engaged with the shoe 305 and is disengaged from the shoe 306 and thus the spark plug 285 is put into operation while the spark plug 286 is inactive.

A pulley 315 is fixed to the shaft 28 of the rotor 25 and provides means whereby motion may be taken from the engine. This pulley 315 also provides a means whereby motion may be imparted to the engine for the purpose of starting. Thus an internal gear may be provided on the pulley and may be meshed with any conventional starting drive mechanism actuated from an electric motor or the like.

In order to provide for lubrication of the motor and for most effective and efficient action thereof the tank 214 may have an oil compartment 316 provided therein. The compartment 316 is entirely isolated from the compressed air compartment of the tank 214 except as to such communication as occurs through a connection 317 which extends between the tops of the compartments and which has a reducing valve 318 embodied therein so that the requisite amount of pressure is applied to the oil. A water tank 319 is also provided and is connected by a pipe 320 to the pipe 243 so that reduced pressure is applied to the water in the tank 119. A shut-off valve 321 is preferably provided in the pipe line 320. The oil and water tanks 316 and 319 respectively communicated by valved pipe lines 322 and 323 respectively with oil and water distributing pipes, designated 324 and 325, respectively. The pipes 324 and 325 are coupled, as at 326 at one end of the engine and as at 327 at one end of the compressor and they are also coupled, as at 328 to a common oil and water pipe 329 which leads into the valve casing 79 of the cutoff valve, as shown in Figure 4. Beyond the point where the pipes 324 and 325 are coupled, as at 326 they are connected by a nipple 330 with a longitudinal duct or passage 331 provided in the shaft 54. This passage 331 extends into the space between the plates of the stator, wherein the water is converted into steam and the oil carried to all of the parts to be lubricated. In order to provide for escape of excess steam an outlet duct or passage 332 is also provided in the shaft 54. Beyond the point where the pipes 24 and 25 are coupled, as at 327, they are connected by means of a nipple 334 with a longitudinal duct or passage 335 formed in the shaft 197 of the compressor, as shown to advantage in Figure 17. This passage 335 leads from the space between the plates 192 of the stator. An outlet passage or duct is also provided in the shaft 197.

It will be understood that a supply of compressed air is maintained in the tank 214 at all times so that when it is desired to start the engine the throttle 217 will be opened to permit the air to flow through the combined carbureter and governor and supply pipe 90 to the reversing valve and thence to either side of the engine according to the position of the reversing valve. If the reversing valve is set, as shown in Figure 4, the air will flow through the pipe 85 into the valve blocks 79 on the left-hand side of the engine, as viewed in Figure 4, from whence it will pass through the ports 74 into the extreme upper portion of the working chamber 68 on the left hand side of the engine. The air will then encounter one of the vanes or pistons 43 and will start the rotor to moving in a counterclockwise direction. When the engine has been started in this manner or by mechanical means, as hereinabove suggested the air which flows through the combined governor and carbureter will be commingled with combustible fuel as above described so that the combustible gas in the working chamber 69 will be ignited by the spark plug 286 and exploded. The portion of the charge which is exploded is that which is comprehended between two adjacent vanes and the charge is not exploded until the uppermost vane has passed the last opened port 74, the spark plug being timed to effect this action. It will be understood that as soon as the engine is started the compressor is also started since the rotors of the engine and compressor are coupled. As the compressor is turned it draws in a charge through the check valve controlled air inlet 206 or 207 as the case may be and also to the check valve control 208 and the air thus drawn in is eventually compressed by the vanes or pistons 182 and is discharged through the outlets 209 and 210 accordingly as the rotor or compressor turns in one or the other direction. The air thus compressed is delivered to the tank 214 and eventually flows into the casing 221 of the combined carbureter and governor. With the engine operating as just described, the gases after having expanded are exhausted first through the exhaust valve 105 on the lower right-hand side of the engine as viewed in Figure 4 and then through the exhaust valve 105 lying uppermost on the right-hand side of the engine as viewed in Figure 4 and finally through the ports 74 on the right-hand side of the engine. By providing for the exhaust in this manner thorough and complete scavenging is had and back pressure is avoided. When the engine has speeded up to the desired point it is maintained at such speed by the action of the governor which shifts the fuel controlled valve 239 of the carbureter and the air controlled valve 238 thereof to cut down the supply of combustible and expansible fuel to the engine.

A relief valve 340 is connected to the top of the compressed air tank 214 and the outlet of the relief valve connects to an air line 341 which is coupled, as at 342 with the supply pipe 90. In this manner the excess of air delivered to the tank 314 is fed to the engine and expanded to assist in the drive or operation thereof. In order to convert the power plant from the internal combustion engine to a steam engine the compressor 160 and the combined carburetor and governor 220 are removed. The supply pipe 90 is connected to the boiler or other source of steam supply and the usual type of governor employed for steam engines is associated with the engine. With this arrangement a cap 345 is bolted to the flange 33ᵃ of the extension 33 of the side member 3 of the casing of the engine. This cap 345 carries a rod 346 designed to fit into the socket 200 of the shaft 75 of the engine to support this shaft. It will be understood that irrespective of whether steam or compressed air or combustible gas is used to drive the engine the cutoff valves 73 may be utilized after the engine is started to increase the expansion efficiency by shutting off one or more of the ports 74.

The arrangement in the engine and in the compressor whereby the rotor is effectively tangent to the casing at two points may be termed the hyper-tangency of the rotor. This hyper-tangency of the rotor corresponds to the following geometric figure. A circle 36 in. in diameter with a chord at right angles to its vertical diameter and intersecting its arc at points 15° on either side of its vertical diameter. A minor circle, with its centre on the diameter, (the vertical diameter) of the larger circle, 32 in. in diameter and intersecting the arc and chord of the larger circle at their points of intersection, thus making the chord of the larger circle common to both circles. The minor circle is approximately $\frac{1}{16}$ in. above the arc of the major circle when in the above described position.

I claim:

1. In a power plant, an engine having a reversing valve, cut off valves and exhaust valves, the exhaust valves being connected and a set of operating levers including a secondary lever connected to the exhaust valves and to the reversing valve, a secondary lever for each cutoff valve, and a main operating lever selectively engageable with the secondary levers.

2. In a power plant, an engine having a reversing valve, cut off valves and exhaust valves, the exhaust valves being connected and a set of operating levers including a secondary lever connected to the exhaust valves and to the reversing valve, a secondary lever for each cutoff valve, a main operating lever selectively engageable with the secondary levers, a casing for said levers having a C-shaped slot in its top, the secondary levers for the cutoff valves being operable in the short sections of the slot and the secondary lever for the reversing valve and exhaust valves being operable in the long section of the slot, each secondary lever having a U-shaped socket at its upper end, the U-shaped socket of the second lever for the reversing and exhaust valves being oppositely disposed with respect to the U-shaped sockets of the secondary levers for the cutoff valve, a common fulcrum shaft for the secondary levers, and the main operating levers, the secondary levers being rotatably mounted on the shaft and the main operating lever being universely mounted thereon, the main operating lever being selectively engageable with the sockets of the secondary levers.

3. In a power plant, an engine having a reversing valve, cutoff valves and exhaust valves, the exhaust valves being connected and a set of operating levers including a secondary lever connected to the exhaust valves and to the reversing valve, a secondary lever for each cutoff valve, a main operating lever selectively engageable with the secondary levers, a casing for said levers having a C-shaped slot in its top, the secondary levers for the cutoff valves being operable in the short sections of the slot and the secondary lever for the reversing valve and exhaust valves being operable in the long section of the slot, each secondary lever having a U-shaped socket at its upper end, the U-shaped socket of the second lever for the reversing and exhaust valves being oppositely disposed with respect to the U-shaped sockets of the secondary levers for the cutoff valve, a common fulcrum shaft for the secondary levers and the main operating levers, the secondary levers being rotatably mounted on the shaft and the main operating lever being universely mounted thereon, the main operating lever being selectively engageable with the sockets of the secondary levers, the secondary levers being resilient in a direction transverse to the path of their movement and being reversibly held in adjusted position.

MICHAEL I. BROWNE.